United States Patent
Uchidoi et al.

[11] 3,922,081
[45] Nov. 25, 1975

[54] SLIDE PROJECTION OVERLAPPING APPARATUS

[75] Inventors: Masanori Uchidoi, Yokohama; Tateo Yamada, Tokyo, both of Japan

[73] Assignee: Canon Kabushiki Kaisha, Tokyo, Japan

[22] Filed: Nov. 7, 1973

[21] Appl. No.: 413,661

[30] Foreign Application Priority Data
Nov. 11, 1972 Japan............................ 47-129977

[52] U.S. Cl. ............................................ 353/86
[51] Int. Cl.² ...................................... G03B 23/16
[58] Field of Search ............ 353/83, 86, 90, 93, 94; 352/91 R, 91 C, 91 T

[56] References Cited
UNITED STATES PATENTS
3,282,155  11/1966  Cleary ................................ 353/86
3,588,241  6/1971  Broom ............................... 353/94
3,622,236  11/1971  Novy ................................. 353/86

Primary Examiner—Richard E. Aegerter
Assistant Examiner—A. Jason Mirabito
Attorney, Agent, or Firm—Toren, McGeady and Stanger

[57] ABSTRACT

A slide projection overlapping apparatus comprising at least two slide projectors associated with a switching device capable, upon advent of a projection terminating signal thereto, of shifting the connections between the slide projectors enabling discontinuity to be avoided in the projections of successive views at transition from the projected slide projector to the next one. The switching device is provided with delay means for delaying by predetermined time intervals the projection terminating signal to be given to at least one of the said slide projectors with the lamp circuits which are intended to be opened and closed in predetermined sequence.

5 Claims, 5 Drawing Figures

SLIDE PROJECTION OVERLAPPING APPARATUS

BACKGROUND OF THE INVENTION

This invention relates to projection overlapping apparatus for use in multiple slide projector arrangements enabling discontinuity to be avoided in the projections of successive views in the transition from one slide projector to the other slide projector.

Slide projectors having automatic slide changing devices incorporated therein are known which in the same slide projector enable discontinuity to be avoided in the projection of successive views inasmuch as several tens of slide films are mounted therein. Owing to the lack of necessity of manually replacing the projected slide with a fresh one, such slide projectors have an advantage of enabling one to display images in a continuous succession of projections, while, in most cases, unavoidably restricting the number of slides replaceable in a continuous succession during one operating cycle to as few as 50.

With a slide projector of the type described above, however, a long-run lecture which is intended to be illustrated with more than 50 slides has to be interrupted at transition between the successive operating cycles. In order to reduce the time interval of such a lecture blank which arises when only one slide projector is employed, a plurality of slide projectors have hitherto been employed along with a switching device therefore which is operated to select the slide projector to be lighted in a predetermined order set therein. However, conventional switching devices of the type described above have only the function of shifting the connections between the slide projector merely in succession but without predetermined sequence. Therefore, when a series of slides which are composed so as to display a continuous motion with time (such as actions of moving sportsmen) in a continuous succession of operating cycles are projected, the exhibition results in intermittance in the transition from one slide change-operating cycle to the other.

In order to remove the drawback, one solution has been proposed for an overlapping device for projecting two successive views one over the other in the transition from one side projector to the other. With an overlapping device of the conventional type, the first view projected from one slide projector disappears considerably before the second view projected from the other slide projector fades in with a sufficient illuminance, thereupon the two successive views do not completely overlap due to the uncontrolled lighting rates of the lamps of the both projectors, although the lamp circuits are opened and closed simultaneously in synchronism with a slide projector connection shifting signal.

SUMMARY OF THE INVENTION

The present invention has for a general object to overcome the drawbacks of conventional switching devices of the type described above, and, therefore, it is an object of the invention to provide a projection overlapping apparatus for use in a multiple slide projector arrangement enabling discontinuity to be avoided in the projections of successive images in the transition from one slide projector to the other slide projector, and, when so required, making it possible to obtain a fading mix effect by projecting gradually two successive views one over the other, the first fading out while the second appearing to fade in and finally replacing it.

Another object of the present invention is to provide a projection overlapping apparatus for use in a multiple slide projector arrangement enabling the opening of the lamp circuit of the projected slide projector to be delayed by a predetermined time interval with respect to the closing of the lamp circuit of the next slide projector, thereby to provide for a fadein-fadeout effect.

Other objects of the present invention will become apparent from the following description of certain specific embodiments with reference to the accompanying drawings.

BREIF DESCRIPTION OF THE DRAWINGS

DESCRIPTION OF THE PREFERRED EMBODIMENTS

Figure 1:
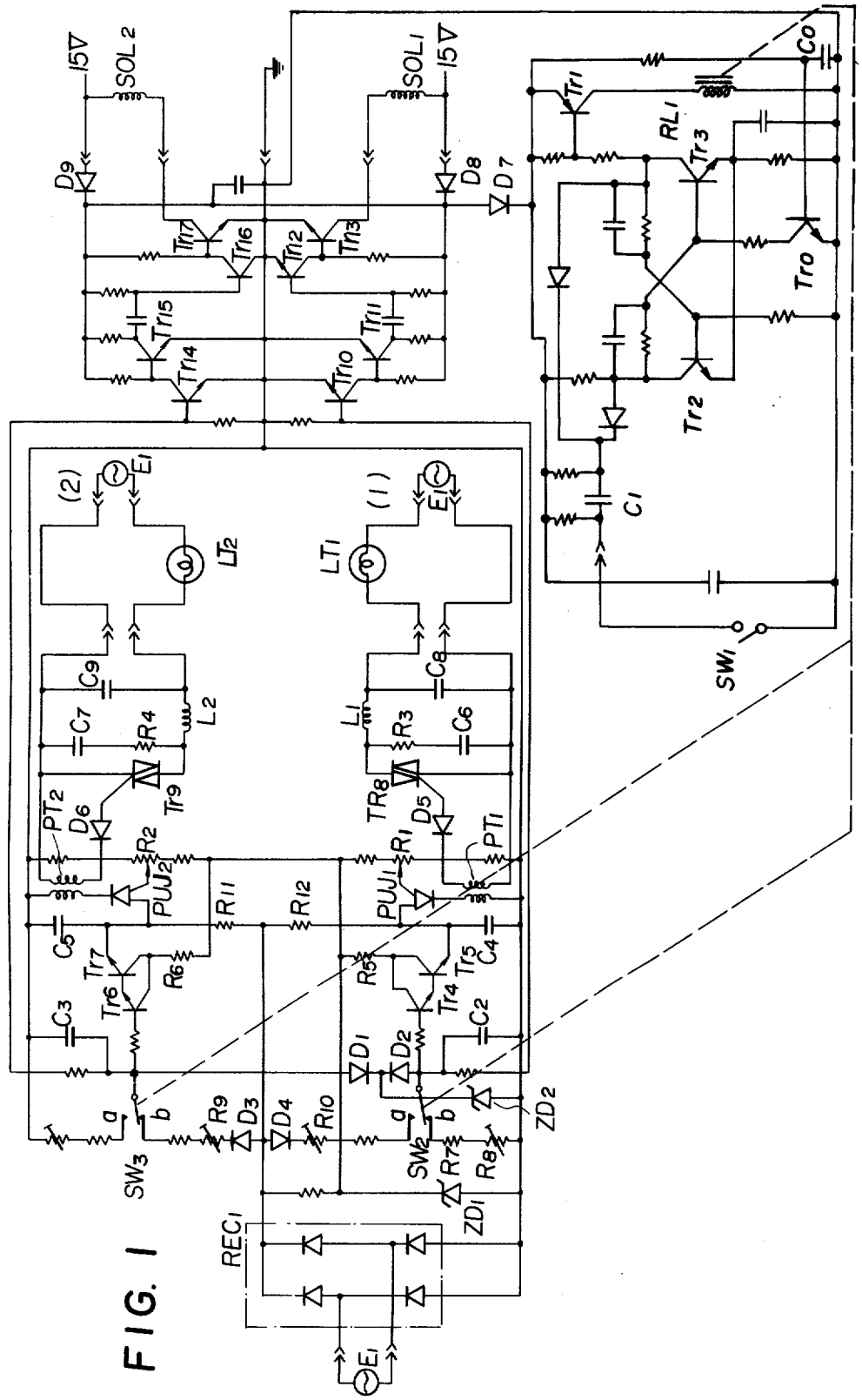
FIG. 1 shows an electrical circuit diagram of an embodiment of the projection overlapping apparatus in accordance with the invention adapted for a double slide projector arrangement.

In FIG. 1, there is shown an electrical circuit of a practical embodiment of the projection overlapping apparatus in accordance with the present invention adapted for a double slide projector arrangement. For the purposes of illustration only, the number of lamp circuits is limited to only two. The electrical circuit comprises a transistor $Tr_1$ which, upon closure of the 15V power source circuit, is made conducting to energize a relay $RL_1$, a transistor $Tr_3$ which is normally held conductive by the biasing provided by a transistor $Tr_0$ and which constitutes a part of a flip-flop circuit including another transistor $Tr_2$, a condenser $C_0$ connected to the base electrode of the transistor $Tr_0$, a condenser $C_1$ connected between a remote control switch $SW_1$ and the flip-flop circuit, a full-wave rectifier circuit $REC_1$, a Zener diode $ZD_1$ for slicing the pulsating current output of said rectifier circuit $REC_1$, another Zener diode $ZD_2$ for controlling the voltage of the charge stored on the condensers $C_2$ and $C_1$ to a predetermined level, diodes $D_1$, $D_2$, $D_3$ and $D_4$ for supplying one-directional currents to said two Zener diodes $ZD_1$ and $ZD_2$, a control condenser $C_2$ of a Darlington connection amplifier ($Tr_4$, $Tr_5$), a control condenser $C_3$ of another Darlington connection amplifier $Tr_6$, $Tr_7$, a condenser $C_4$ connected between the anode and cathod of a programmable uni-junction transistor $PUJ_1$ through a primary winding of a pulse transformer $PT_1$, a condenser $C_5$ connected between the anode and cathode of another programmable uni-junction transistor $PUJ_2$ through a primary winding of a pulse transformer $PT_2$, and a variable resistor $R_2$ for controlling the voltage at the gate of transistor $PUJ_2$. The lamp circuits of slide projectors 1 and 2 comprise respectively diodes $D_5$ and $D_6$, triacs $Tr_8$ and $Tr_9$ for controlling the currents flowing through lamps $LT_1$ and $LT_2$, circuit portions each consisting of a resistor and a condenser $R_3$ and $C_6$, and $R_4$ $C_7$ for protecting the triacs $Tr_8$ and $Tr_9$, and noise filters of an inductance and a capacitor $L_1$ and $C_8$, and $L_2$ and $C_9$. A group of transistors $Tr_{10}$, $Tr_{11}$, $Tr_{12}$ and $Tr_{13}$ is provided for energizing or deenergizing a slide change plunger of one slide projector, and a group of transistors $Tr_{10}$, $Tr_{15}$, $Tr_{16}$ and $Tr_{17}$ for energizing and deenergizing a slide change plunger of the other slide projector. There are further provided condensers $C_{10}$, $C_{11}$, diodes $D_7$, $D_9$ and resistors $R_9$, $R_{10}$, $R_{11}$ and $R_{12}$.

Figure 2A:
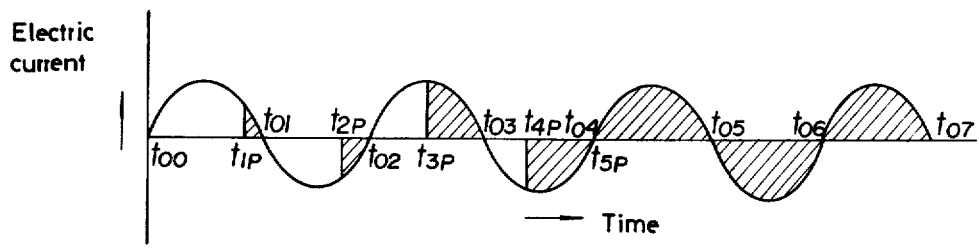
FIGS. 2A and 2B show the typical current waveforms occurring in the lamp circuits of FIG. 1 to illustrate the operation of the slide projection overlapping apparatus of the invention.
Figure 2B:
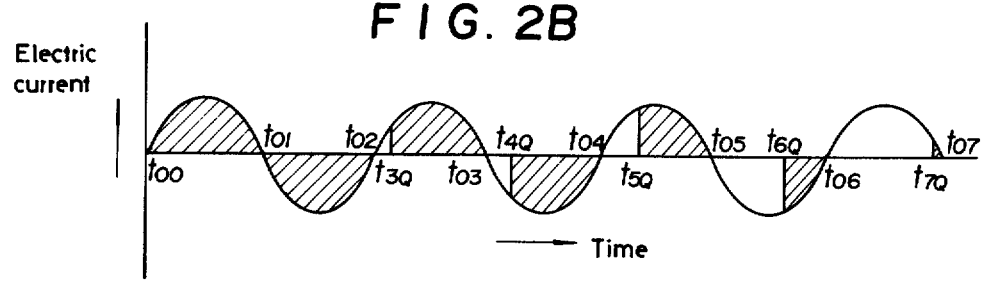
Figure 4:
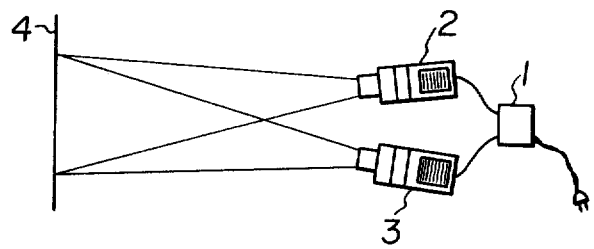
FIG. 4 is a top view of a double slide projector arrangement with the projection overlapping apparatus in accordance with the invention therein.

In a particular embodiment of the switching circuit parameters, the intensities of current flowing through the lamp circuits of the two slide projectors are varied as shown in FIGS. 2A and 2B, wherein the ordinates represent current outputs and the abscissae are in time. In order to produce an overlapping effect at the projections of successive two views at transition from one slide projector to the other slide projectors, the two slide projectors may be arranged as illustrated in FIG. 4 wherein a projection overlapping apparatus 1 is connected to slide projectors 2 and 4 positioned in front of a screen 4. For the convenience of explanation, the slide projector arrangement is illustrated as consisting of only two slide projectors as in FIG. 1. However, it is to be noted that the objects of the present invention can be likewise realized in arrangements comprising more than two slide projectors by accommodating for a connection-shifting device such as a ring counter coupled to the projection overlapping apparatus.

Consideration will next be given to the operation of the projection overlapping apparatus. In FIG. 1, as soon as the 15V power circuit is activated by closing its power source switch not shown and then the power supply source $E_1$ is connected to rectifier $REC_1$ by means of its power source switch not shown, the transistor $Tr_3$ is made conducting to cause a base current to flow in transistor $Tr_1$, thereupon transistor $Tr_1$ is driven to conduct, so that the transistor $Tr_0$ is "off" until the voltage across condenser $C_0$ reaches a predetermined level, at which level normally no-conducting transistor $Tr_0$ is forward biased into conduction. The conductive condition of transistor $Tr_0$ does not drive transistor $Tr_3$ to non-conduct, so that the transistor $Tr_1$ is held in conducting state. So long as transistor $Tr_1$ is "on", the relay $RL_1$ is energized to set to the position, $b$, a circuit transfer switch including, in the present instance, two transfer switch elements $SW_2$ and $SW_3$ that are commonly interconnected mechanically for conjoint operation from one position to the other position, thereby the lamp $LT_1$ of the slide projector 1 is lighted, while the lamp $LT_2$ of the slide projector 2 is not lighted. (The process from the energization of the relay $RL_1$ to the lighting of the lamp 1 will be described later).

When a remote control switch $SW_1$ is closed to instantaneously generate a slide projector connection shifting signal, a negative pulse is given through condenser $C_0$ to transistors $Tr_2$ and $Tr_3$, so that the conducting transistor $Tr_3$ is cut off, while normally not-conducting transistor $Tr_2$ is switched on. When transistor $Tr_2$ is forward biased to conduction, the base current of the transistor $Tr_1$ is cut off, and the transistor $Tr_0$ is "off", so that the energization of the relay $RL_1$ is terminated, thereupon the transfer switch means $SW_2$, $SW_3$ is operated from the position, $a$, to the position, $b$. When the pole of the transfer switch element $SW_3$ is brought into contact with the throw, $b$, the full-wave rectifier circuit $REC_1$ begins to charge condenser $C_3$ through diode $D_3$, the contact, $b$, of the transfer switch element $SW_3$ and the resistor $R_9$. As the quantity of charge stored on condenser $C_3$ increases with increase in the base potential of transistor $Tr_6$, transistors $Tr_6$ and $Tr_7$ are made conducting to charge condenser $C_5$ from rectifier $REC_1$ through resistor $R_6$. Further supplied to condenser $C_5$ is a quantity of charge through resistor $R_{11}$. When the anode potential of transistor $PUJ_2$ reaches a predetermined level, transistor $PUJ_2$ is made conducting.

After elapse of a certain time period from the initiation of charging of condenser $C_3$, transistor $PUJ_2$ is switched on to instantaneously induce a pulse in the secondary winding of pulse transformer $PT_2$, the pulse triggering the triac $Tr_9$ through the diode $D_6$ to make triac $Tr_9$ conducting. As a result, at time $t_{1p}$, the lighting of the lamp $LT_2$ of slide projector 2 is initiated, being delayed by a time interval $t_{1p} - t_{00}$ from the instant $t_{00}$ at which the transfer switch element $SW_3$ is operated. At time $t_{01}$, however, the potential of power source $E_1$ is reversed to cut off triac $Tr_9$, thereafter no current flows through lamp $LT_2$. In the next reversed half cycle $t_{01} - t_{02}$ of voltage of the power supply source, the time interval during which transistor $PUJ_2$ is cut off, or the phase angle of conduction of triac $Tr_9$ is smaller than in the preceeding half cycle, because a certain quantity of charge was already stored on condenser $C_3$ during the preceeding half cycle $t_{01} - t_{02}$, so that at time $t_{2p}$ a current starts to flow again through lamp $LT_2$ of slide projector 2. Likewise, in the half cycle $t_{02} - t_{03}$, the phase angle of conduction of the triac $Tr_9$ is further decreased to time $t_{3p}$ at which a current begins to flow. In this way, the intensity of current flowing through lamp $LT_2$ increases and finally reaches the maximum. Variation of projection illuminance is illustrated at curve P in FIG. 3.

As far as the mode of progressively applying electric energy to the lamp circuit of only one slide projector is concerned, the process so far described is not distinct from that in a conventional projection overlapping apparatus.

The operation of the lamp circuit of the other slide projector that has been projected will be described with respect to how the intensity of current begins to decrease in response to a connection shifting signal. Upon advent of a connection shifting signal from the remote control switch, the transfer switch element $SW_2$ cooperating with transfer switch element $SW_3$ is operated from the position, $a$, to the other position, $b$. The charge stored on condenser $C_2$ starts to leak away through resistor $R_7$ and variable resistor $R_8$ to earth. However, the voltage of charge stored on condenser $C_2$ is higher than that necessary for the lamp to provide for a sufficient projection illumination, so that the triac $Tr_8$ is made conducting at a small angle of conduction. The process of conduction of said triac is the same as that described above. The current flowing through lamp $LT_1$ during the half cycle $t_{00} - t_{01}$ is illustrated in FIG. 2B.

In a period of time $t_{3Q}$, the condenser $C_2$ is charged at a voltage $V_{t_{3Q}}$ given by the formula $$V_{t_{3Q}} = V_* \left\{ 1 - e^{-\left(\frac{t_{3Q}}{(R_7 + R_8)C_2}\right)} \right\}$$

wherein Vs is the sum of the Zener voltage of Zener diode $ZD_2$ and the voltage drop of the diode $D_2$, whereby the conducting of transistor $PUJ_1$ is delayed by a time interval $t_{3Q} - t_{02}$ from time $t_{02}$. Therefore, the intensity of current flowing through lamp $LT_1$ is slightly reduced as incidated in FIG. 2B. At time $t_{4Q}$, the voltage $V_{t_{4Q}}$ across the condenser $C_2$ is given by the formula $$V_{T_{4Q}} = V_s \left\{ 1 - \epsilon^{\left(-\frac{T_{4Q}}{(R_7 + R_8)C_2}\right)} \right\}$$

so that the time interval during which transistor $PUJ_1$ is conducting is furthermore shorted to decrease the intensity of current flowing through lamp $LT_1$ as indicated in FIG. 2B. The cumulative cycle will continue until the voltage of condenser reaches a cut off voltage of transistors $Tr_4$ and $Tr_5$, resulting in non-conductive state of transistor $PUJ_1$ as well as triac $Tr_8$ which causes no current to flow through lamp $LT_1$, thereupon the lamp is completely lighted off.

Figure 3:
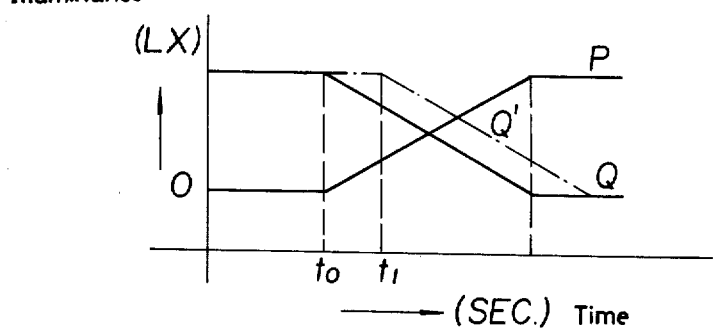
FIG. 3 is a graph illustrating variations of illuminance at the projections from the two slide projectors with the projection overlapping apparatus in accordance with the invention during the respective predetermined time intervals having a common portions and distinct portions at transition from one slide projector to the other projector.

As shown at curve Q' in FIG. 3, the time at which the projection illuminance starts to decrease is shifted from $t_0$ to $t_1$ by charging condenser $C_2$ at a voltage higher than that necessary for the lamp to provide for a sufficient projection illuminance. The starting of illuminance decrease is delayed by a longer time interval with a larger difference between the Zener voltages $VZD_1$ and $VZD_2$ of the Zener diodes $ZD_1$ and $ZD_2$. In a modified form of the present invention, combinations of a timer and condensers may be utilized to control the delay of opening of the lamp circuit of one slide projector with respect to the closing of the lamp circuit of the other slide projector.

The circuit of the projection overlapping apparatus of the present invention may be associated with slide changing circuits which are illustrated in FIG. 1 as including transistors $Tr_{10}$, $Tr_{11}$, $Tr_{12}$ and $Tr_{13}$ and a slide changing plunger solenoid $SOL_2$. With the circuit, the slide changing plunger is attracted or released in synchronism with a slide changing signal. The operation of the circuit is as follows. In order to replace the projected slide with a fresh one, the remote control switch $SW_1$ is closed, thereby the relay $RL_1$ is deenergized to operate the transfer switch means $SW_2$, $SW_3$ to the position, b. When the transfer switch element $SW_3$ is set to the position, b, a trigger voltage from rectifier $REC_1$ through a diode $D_3$ is applied to the base electrode of transistor $Tr_{14}$ at which transistor $Tr_{14}$ is made conducting. This decreases the base potential of transistor $Tr_{15}$ to cut off it, with the result that transistor $Tr_{16}$ is forward biased into conduction. When the transistor $Tr_{16}$ is forwared biased into conduction, it lowers the base voltage of transistor $Tr_{17}$. Thus transistor $Tr_{17}$ ceases conducting, and the solenoid $SOL_1$ is deenergized.

Whilst the slide change plunger ($SOL_2$) of one slide projector 2 is released, the slide change plunger ($SOL_1$) of the other slide projector 1 is attracted in such a way that when the transfer switch $SW_2$ is set to the position, b, condenser $C_2$ begins to be discharged and voltage across the condenser $C_2$ decreases during a time interval to the cut off level for transistor $Tr_{10}$. This causes transistor $Tr_{11}$ to conduct so that transistor $Tr_{12}$ is cut off. Thus transistor $Tr_{13}$ begins conducting and the solenoid $SOL_1$ is energized. After elapse of a certain time interval, however, the voltage across the condenser connected between transistors $Tr_{11}$ and $Tr_{12}$ is increased by charging to the trigger level for transistor $Tr_{12}$. Thus transistor $Tr_{13}$ is cut off and the solenoid $SOL_1$ is deenergized again.

It will be seen from the foregoing description that the described embodiment of the invention accomplishes the above-mentioned objects by providing a projection overlapping apparatus enabling sudden change of illuminance to be avoided in the projections of two successive views when the connection is shifted from one slide projection to the other slide projector, and, when so required, making it possible to obtain a fading effect by projecting gradually the two successive views one over the other. Therefore, a number of slides which when projected display a continuous movement of the photographed subject such as pitching in baseball mound may be projected by using two or more slide projectors in succession without wearying attention of viewers.

What is claimed is:

1. A slide projection overlapping apparatus comprising:

a plurality of slide projecting means;

power supply means for providing currents to said slide projecting means for the generation of luminous energy outputs from said projecting means;

switching means coupled to said supply means for opening or closing said supply means;

means for generating a pulse signal for shifting the connections between said projecting means;

switch control means for selectively controlling the operation of said switching means in response to pulse signal generating means;

voltage control means coupled to said supply means for varying the levels of illumination of said projecting means, said voltage control means being responsive to the application of a voltage thereto from a power supply source to cause the voltages controlled by said voltage control means to linearly increase until predetermined voltage levels are reached, said voltage control means also being responsive to the cut-off voltage from a power supply source to cause the voltages controlled by said voltage control means to linearly decrease until predetermined voltage levels are reached, said voltage control means also including time delay means for delaying the commencement of decrease of voltage levels when said supply source voltage is cut off; and wherein said power supply means is an AC voltage source provided with rectifier means for rectifying the alternating current from said AC voltage source, and wherein said voltage control means further includes time constant circuit means comprising a capacitor and a first resistor connected through said switching means to an output terminal of said rectifier means, a second resistor arranged to be connected to said capacitor when said switching means cuts off said supply means, a second switching means coupled to said supply means for controlling the supply of alternating current from said AC voltage source and a trigger means for generating a pulse for triggering the trigger circuit of said second switching means in accordance with the output of said capacitor, thereby the phase angle of conduction of said second switching means is controlled in accordance with the output of the time constant circuit so that the voltage output of said voltage control means will linearly increase or decrease.

2. A slide projection overlapping apparatus as described in claim 1, wherein said second switching means is a triac.

3. A slide projection overlapping apparatus as described in claim 1, wherein
said trigger means is provided with
a third switching means which is triggered by the output of said capacitor, and
a pulse transformer connected between the trigger circuits of said second and third switching means for generating a trigger pulse by the output of said third switching means.

4. A slide projection overlapping apparatus as described in claim 3, wherein said third switching means is a programmable uni-junction transistor.

5. An apparatus for projecting images from a pair of slide projectors onto a common screen area, comprising;
an electric power source for supplying current to lamps of each of said slide projectors;
a first pair of switching means for connecting and disconnecting said electric power source to a corresponding projector lamp;
a D.C. power source;
a pair of time constant circuits having a resistor and a capacitor;
means for producing a projector change over signal;
a change over mechanism which connects one of said pair of time constant circuits to said D.C. power source and disconnects the other circuit from said D.C. power source in correspondence with said change over signal;
a discharge path having resistor means, which is connected in parallel to the capacitor of the other time constant circuit by said change over mechanism;
a pair of trigger pulse generating means connected to each of said time constant circuits to produce a signal passing through said pair of switching means corresponding to said time constant circuits;
a voltage source for adding a voltage to the capacitor of one of said time constant circuits for delaying the start of the dimming of the projector lamp a predetermined time corresponding to said circuit when said change over mechanism disconnects one of the pair of time constant circuits from said D.C. power source;
whereby one of the projector lamps commences illumination in association with said change over signal and the other lamp illumination decrease after a predetermined time.

* * * * *